(12) United States Patent
Bucey et al.

(10) Patent No.: US 6,786,079 B2
(45) Date of Patent: Sep. 7, 2004

(54) APPARATUS AND METHOD FOR TESTING A RECUPERATOR CORE FOR LEAKAGE

(75) Inventors: Charles W. Bucey, San Diego, CA (US); Timothy A. Booth, Pekin, IL (US); Steven W. Clayton, Metamora, IL (US); Robert M. Jones, Metamora, IL (US)

(73) Assignee: Solar Turbines Inc., San Diego, CA (US)

(*) Notice: Subject to any disclaimer, the term of this patent is extended or adjusted under 35 U.S.C. 154(b) by 9 days.

(21) Appl. No.: 10/023,585

(22) Filed: Dec. 17, 2001

(65) Prior Publication Data

US 2003/0110839 A1 Jun. 19, 2003

(51) Int. Cl.[7] .................................................. G01M 3/04
(52) U.S. Cl. ............................ 73/49.2; 73/49.2; 73/40; 73/40.7
(58) Field of Search ........................... 73/49.2, 40, 40.7

(56) References Cited

U.S. PATENT DOCUMENTS

| | | | | |
|---|---|---|---|---|
| 2,136,086 A | * | 11/1938 | Rosenblad | 165/166 |
| 2,454,310 A | * | 11/1948 | Ganahl | 60/266 |
| 2,887,456 A | * | 5/1959 | Halford et al. | 502/347 |
| 3,098,522 A | * | 7/1963 | McCormick | 165/166 |
| 3,208,131 A | * | 9/1965 | Ruff et al. | 29/890 |
| 3,285,326 A | * | 11/1966 | Wosika | 165/4 |
| 4,688,627 A | * | 8/1987 | Jean-Luc et al. | 165/11.1 |
| 4,862,731 A | * | 9/1989 | Gates | 73/40.7 |
| 5,060,721 A | | 10/1991 | Darragh | |
| 5,081,834 A | * | 1/1992 | Darragh | 60/39.511 |
| 6,520,002 B2 | * | 2/2003 | Bucey et al. | 73/40 |

* cited by examiner

Primary Examiner—Hezron Williams
Assistant Examiner—André K. Jackson
(74) Attorney, Agent, or Firm—Larry Cain

(57) ABSTRACT

A recuperator core has a plurality of passages sealingly formed therein. In use, a fluid passes through a respective one of the plurality of passages under pressure. The recuperator core must be tested to determine an operational efficiency or leakage within the respective plurality of passages. A pair of sealing mechanisms are positioned at a respective one a pair of ends of the respective one of the plurality of passages. A pressure or a vacuum is pulled across the respective ones of plurality of passages and a rate of leakage or decay rate is monitored to define an operational recuperator core and a failed recuperator core.

16 Claims, 3 Drawing Sheets

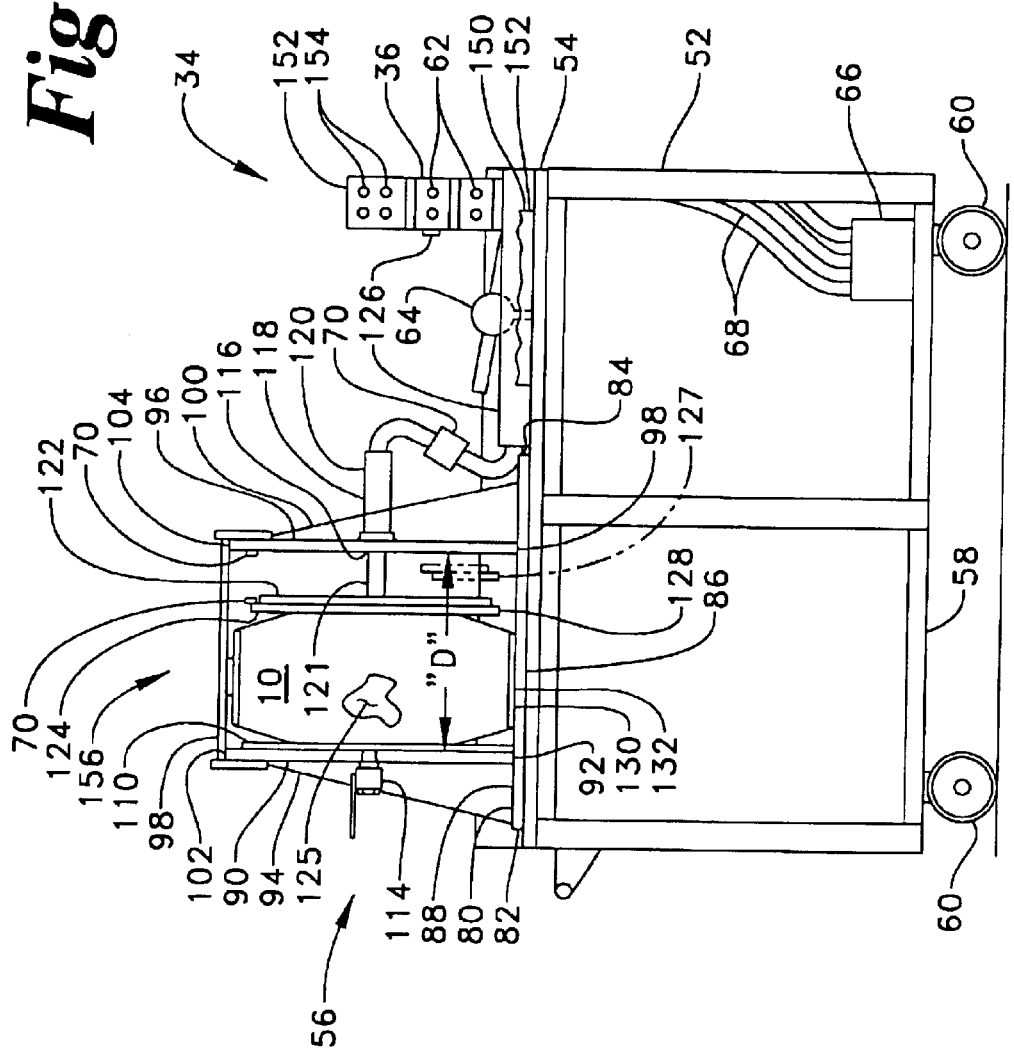

APPARATUS AND METHOD FOR TESTING A RECUPERATOR CORE FOR LEAKAGE

TECHNICAL FIELD

This invention relates generally to a heat exchanger or more explicitly to a recuperator and more particularly to a method and an apparatus for testing the leakage within a core of the recuperator.

BACKGROUND

Many gas turbine engines use a heat exchanger or recuperator to increase the operation efficiency of the engine by retracting heat from the exhaust gas and preheating the intake air. Typically, a recuperator for a gas turbine engine must be capable of operating at temperatures of between about 500 degrees C. and 700 degrees C. and internal pressures of between approximately 450 kPa and 1400 kPa under operating conditions involving repeated starting and stopping cycles.

A recuperator is made from a plurality of cells. The cell is made from a plurality of components parts. The assembly of the plurality of cells form a core having a donor passage and a recipient passage. The components of the cell are welded together and tested for leakage and the plurality of cells are welded together forming the core. An example of such a plurality of welded cells resulting in the core is shown in U.S. Pat. No. 5,060,721 issued on Oct. 29, 1991 to Charles T. Darragh.

As stated above, during the assembly of the cells and the recuperator core, the interface of the components are welded. The effectiveness of the welding process used to form the core is in many instances depended on the fitting relationship of the plurality of cells, the resulting configuration of the interface of the individual ones of the plurality of cells and the welding process itself. The results of these variables in some instances results in a leaking core, leakage between the donor passage and the recipient passage. Thus, it is necessary to inspect or check the reliability of the welded core against leaks prior to installing into the recuperator application. The inspection process adds cost to the finished core, which to insure reliability may be necessary, but the cost effectiveness of such an inspection process can reduce profitability. Inspection or checking must be done in a reliable and cost effective manner.

The present invention is directed to overcome one or more of the problems as set forth above.

SUMMARY OF THE INVENTION

In one aspect of the invention, an apparatus for testing a leakage rate within a recuperator core is disclosed. The recuperator core has a plurality of components, such components being a plurality of cells being welded one to another. The apparatus has a platform defining a first end and a second end. A first surface of the platform extends between the first end and the second end. A first support portion is attached to the first surface and a second support portion is spaced from the first support portion and each being attached to the first surface. A pair of sealing mechanisms, at least one of the pair of sealing mechanisms being movable between an open or non testing position and a closed or testing position. In the closed or testing position a reservoir is formed. A pump being operatively connected to at least one of the pair of sealing mechanisms. A monitoring system being operatively connected to the platform, the pair of sealing mechanisms, the reservoir and the pump. And, a readout station being operatively connected to the monitoring system, the reservoir and the pump.

In another aspect of the invention, a method of testing a recuperator core is disclosed. The recuperator core has a plurality of donor passages defining a donor inlet end and a donor outlet end and a plurality of recipient passages defining a recipient inlet end and a recipient outlet end. The plurality of donor passages are sealed from the plurality of recipient passages. The method of testing the recuperator core has the steps of positioning the recuperator core in a test stand; positioning a sealing member in sealing relationship with one of the donor inlet end and the recipient inlet end and positioning an other of the sealing member in sealing relationship with one of the donor outlet end and the recipient outlet end forming a reservoir and defining a closed or testing position; actuating a controller applying one of a pressure and a vacuum to the reservoir; monitoring a rate of decay of the pressure and the vacuum; and displaying the rate of decay.

BRIEF DESCRIPTION OF THE DRAWINGS

FIG. 3 is a detailed view of a test station;

DETAILED DESCRIPTION

Figure 1:
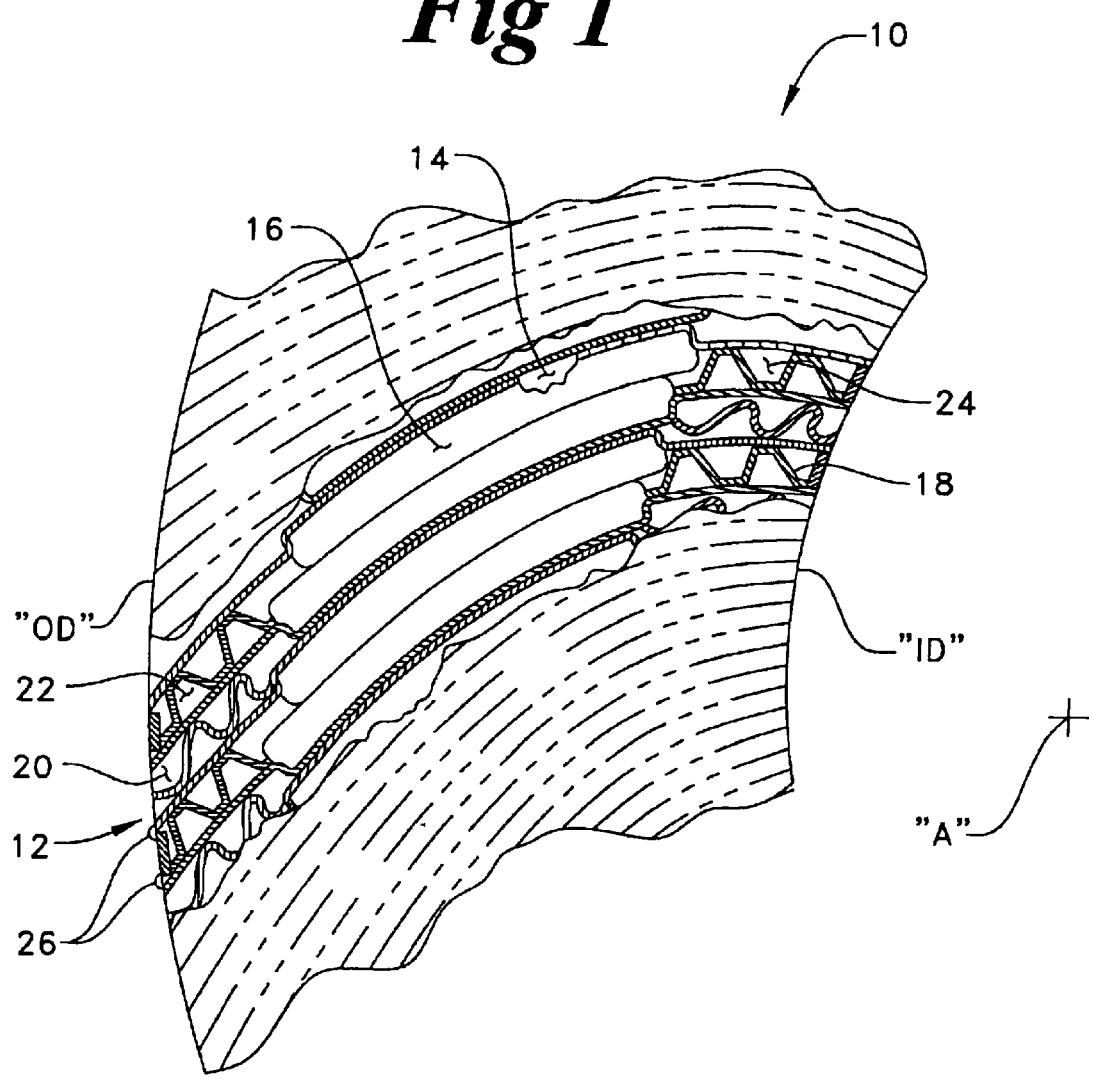
FIG. 1 is a view of a recuperator core being partially sectioned.

As best shown in FIG. 1, a recuperator core 10 is formed from a plurality of cells 12. In this application, the recuperator core 10 has a circular shape and a cylindrical configuration, however, as an alternative any configuration of a recuperator core 10 can be tested. For example, the geometric shape or configuration of the recuperator could be a square, a trapezoidal or a rectangular, without changing the gist of the invention. The recuperator core 10 has a plurality of donor passages 14 and a plurality of recipient passages 16 defined therein. Each of the plurality of donor passages 14 has a donor inlet end 18 and a donor outlet end 20. Each of the plurality of recipient passages 16 has a recipient inlet end 22 and a recipient outlet end 24. The circular core 10 defines a central axis "A", an inside diameter "ID" and an outside diameter "OD". A plurality of welds 26 are used to complete the assembly of each of the plurality of cells 12. Additional welds 26, not shown, are used in forming and combining the plurality of cells 12 forming the circular recuperator core 10.

Figure 2:
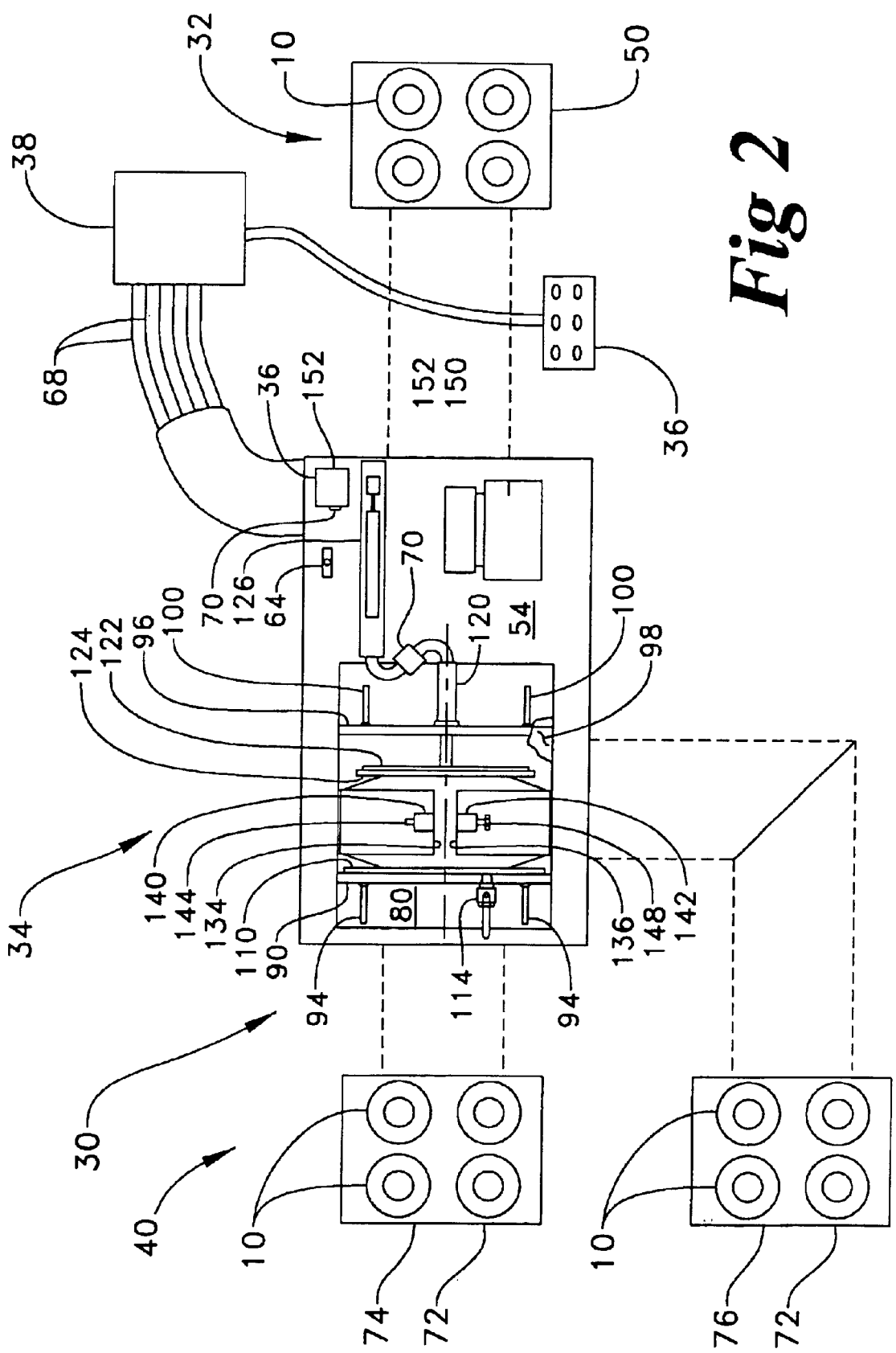
FIG. 2 is a generally schematic view of a leak testing system.

As best shown in FIG. 2, a system, apparatus and/or assembly line 30 has an input end or station 32, a testing station 34, a control panel or operations station 36, a vacuum or pressure station 38 and an output end or station 40 operatively connected one with the other. The input end or station 32 has a tub or flat 50 positioned near the testing station 34. In this application, as best shown in FIG. 3, the testing station 34 is positioned on a table or movable cart 52. The cart 52 has a top portion 54 on which is positioned a test stand 56. A bottom portion 58 of the cart 52. as best shown in FIG. 3. has a set of rotatable wheels 60 attached thereto. The control panel 36 is operatively connected to the cart 52, such as by wires, and has a plurality of switches 62 operatively positioned therein. In this application, the control panel 36 is physically attached to the cart 52 and moves with the cart 52. A portion of the plurality of switches 62 are safety switches. The control panel 36 also has a monitoring system 64 operatively attached to the testing station 34 and the vacuum or pressure station 38. Another portion of the plurality of switches 62 are operatively connected to the test stand 56 of the testing station 34, the vacuum or pressure station 38 and the monitoring system 64, such as by wires. The vacuum or pressure station 38 has a source for pulling a vacuum or applying a pressure, a pump 66 and a plurality of lines 68 interconnected with the testing station 34. The monitoring system 64 has a plurality of sensors 70 operatively connected to the vacuum or pressure pump 66, the testing station 34 and the plurality of switches 62. The output end or station 40 has a pair of tubs or flats 72 positioned near the testing station 34. One of the pair of tubs or flats 72 defines an acceptable or operational position 74 for the core 10 to be placed thereon and the other of the pair of tubs or flats 72 defines a non acceptable or failed position 76 for the core 10 to be placed thereon.

The test stand 56 has a platform 80 defining a first end 82 and a second end 84. A first surface 86 of the platform 80 extends between the first end 82 and the second end 84. The first surface 86 is attached to the top portion 54 of the cart 32. A second surface 88 of the platform 80 is spaced from the first surface 84 a preestablished distance and extends between the first end 82 and the second end 84. A first support portion 90 of the test stand 56 has a first end 92 attached to the second surface 88 near the first end 82. A pair of brace members 94 are interposed the first support portion 90 and the first end 82. A second support portion 96 has a first end 98 attached to the second surface 88 near the second end 84. An other pair of brace members 100 are interposed the second support portion 96 and the second end 84. The first support portion 90 and the second support portion 96 are spaced apart a preestablished axial distance "D". In this application, a brace 98 extends between a second end 102 of the first support portion 90 and a second end 104 of the second support portion 96. The first support portion 90 has a sealing member 110 attached thereto which operatively communicates with the core 10. The first support portion 90 has a valve member 114 attached thereto. A first end 116 of a pressure member 118, such as a cylinder 120, is operatively attached to the second support portion 96. A rod end 121 of the pressure member 118 is attached to a plate 122. The plate 122 is moved along the axial distance "D" and has an infinite number of positions. A sealing member 124 is attached to the plate 122. A source of flow 126, such a hydraulic pump or air compressor activates the cylinder 120 within the distance "D". The sealing member 124 is movable between an open or non-testing position 127 and a closed or testing position 128. With the sealing member 110, the core 10 and the sealing member 124 in the closed or testing position, a reservoir 125 is formed therebetween. The valve member 114 and the source for pulling a vacuum or applying a pressure, the pump 66 are operatively connected to the reservoir 125. As an alternative, the sealing member 110 could be movable forming the open or non-testing position 127 and the closed or testing position 128.

The test stand 56, used for testing the circular core 10 of this application, has a guard member 130 attached therearound. The guard member 130 has a band portion 132 extending between a first end 134 and a second end 136. A tightening member 138 extends between the first end 134 and the second end 136. In this application, the tightening member 138 has a threaded boss member 140 attached to one of the ends 134,136, a stationary member 142 attached to the other of the ends 134,136 and a threaded member 144 having a hex end 148 thereon extending between the threaded boss member 140 and the stationary member 142.

The monitoring system 64, in this application, is operated by using a controller 150, such as a computer and a self guided program, not shown. The program directs an operator through a testing operation which defines a plurality of steps. With input from the operator, the controller 150 defines a plurality of parameters. The plurality of steps and the plurality of parameters in the testing operation can be controlled manually or automatically. The operator identifies the core 10 to be tested, a first time test of the core 10 or a multiple test of a used or reworked core 10. The results of the test is recorded and stored within a readout station 152. A plurality of lights and/or signals 154 indicate to the operator the results of the test. The results of the test indicate a decay rate of the core 10. The results of the test can be printed on a hard copy and/or the results can be visually marked on the core 10. For example, the visual marking is normally applied to the "ID" or the "OD" of the core 10 by marker 156.

Industrial Applicability

In operation, as best shown in FIGS. 2 and 3, one of the cores 10 is removed from the tub 50 at the input end or station 32. The core 10 is positioned on the platform 80 of the test stand 56. The guard member 130 is positioned about the "OD" of the core 10 and the threaded member 144 of the tightening member 138 is threadedly engaged with the threaded boss member 140 maintaining the guard member 130 about the "OD" of the core 10 in a fixed position.

The core 10 and the guard member 130 are positioned between the first support portion 90 and the second support portion 96. The central axis "A" of the core 10 is positioned generally centered on each of the sealing member 110 attached to the first support portion 90 and the sealing member 124 attached to the second support portion 96. The source of flow 126 is activated by the operator administrating the appropriate one of the plurality of switches 62 and the plate 122 is moved axially by the cylinder 120. Thus, each of the sealing member 110 and the sealing member 124 sealingly contact the core 10 at opposite ends. And, the reservoir 125 is formed.

The operator actuates the program by using the control panel 36 and the system or apparatus or assembly line 30 is directed through the testing operation. For example, the operator defines and inputs the plurality of testing parameters. The identify of the core 10, serial number, first time test, multiple test or used core 10 is identified. And, the program precedes through the steps of the procedure. The results of the test is recorded and stored for future use and in most situations is printed on a hard copy. In some tests, the results of the test are stamped or visually marked on the core 10 itself. The test substantially uses a flow from the vacuum or pressure station 38 which enters or exits through the lines 68. After the pressure or vacuum, within the reservoir 125, reaches a predetermined value, the monitoring system 64 defines the rate of leakage within the plurality of donor passage 14 and/or plurality of recipient passages 16 and records the rate of leakage for future use. The plurality of light and/or signals 152 indicate to the operator the results of the test.

The operator then removes the core 10 from between the first support portion 90 and the second support portion 96. By actuating one of the plurality of switches 62, the pressure in the cylinder 120 is relived allowing the core 10 and the guard member 130 to be removed. The operator removes the guard member 130 by loosening the threaded member 144 from the threaded boss member 140 and the core 10 is placed in the appropriate one of the operational core 10 position 74 and the failed core 10 position 76 at the output end 40. The failed or rejected core 10 are, where feasible, reworked to overcome their deficiencies and retested.

Thus, an efficient and effective method is used to test the reliability of the core 10. The method has proven to be a reliable and cost effective operation. The leakage rate of each core 10 is determined and recorded. Thus, if during the longevity of the core 10, the efficiency is found to have been reduced the core 10 can be retested to confirm or rebut the suspected loss in efficiency. Furthermore, the reduction in efficiency can be monitored and improvements can be setforth.

Other aspects and advantages of this invention can be obtained from a study of the drawings, the disclosure, and the appended claims.

What is claimed is:

1. An apparatus for testing a leakage rate within a recuperator core, wherein a rate of decay has a predefined acceptable rate and a predefined rejection rate for said recuperator core, said recuperator core having a plurality of components, such components being a plurality of cells being welded one to another, said apparatus comprising:
   a platform defining a first end and a second end, a first surface of the platform extends between said first end and said second end, a first support portion being attached to said first surface and a second support portion being spaces from said first support portion and each being attached to said first surface;
   a pair of sealing mechanisms, one of said pair of sealing mechanisms having a rod end of a pressure member attached thereto and being movable in an infinite number of positions resulting in said one of said pair of sealing mechanisms being movable between an open or non testing position and a closed or testing position, in said closed or testing position a reservoir being formed;
   a pump being operatively connected to at least one of said pair of sealing mechanisms;
   a monitoring system being operatively connected to said platform, said pair of sealing mechanisms, said reservoir and said pump; and
   a readout station being operatively connected to said monitoring system, said reservoir and said pump.

2. The apparatus for testing a leak within a recuperator core of claim 1, wherein said monitoring system includes a plurality of sensors.

3. The apparatus for testing a leak within a recuperator core of claim 2, wherein said plurality of sensors operational sensing said pair of sealing mechanisms being positioned in said closed or testing position.

4. The apparatus for testing a recuperator core of claim 2 wherein said plurality of sensors define that said pair of sealing mechanisms are at said open or non-testing position.

5. The apparatus for testing a leak within a recuperator core of claim 1, wherein said monitoring system has a plurality of safety devices operatively attached thereto.

6. The apparatus for testing a leak within a recuperator core of claim 1, wherein said readout station has a visual indicator.

7. The apparatus for testing a recuperator core of claim 6 wherein readout station visually marks a result of said tested recuperator core on said recuperator core.

8. The apparatus for testing a recuperator core of claim 7 wherein said readout station indicates a decay rate of said recuperator core.

9. A method of testing a recuperator core, said recuperator core having a plurality of donor passages defining a donor inlet end and a donor outlet end and a plurality of recipient passages defining a recipient inlet end and a recipient outlet end, said plurality of donor passages being sealed from said plurality of recipient passages, said method of testing said recuperator core comprising the steps of:
   positioning said recuperator core in a test stand and wherein prior to said step of positioning said recuperator core in said test stand said recuperator core having a guard member position about an "OD" of said recuperator core;
   positioning a sealing member in sealing relationship with one of said donor inlet end and said recipient inlet end and a rod end of a pressure member being attached to an other of said sealing members and being movable in an infinite number of positions resulting in positioning said an other of said sealing member in sealing relationship with one of said donor outlet end and said recipient outlet end forming a reservoir and defining a closed or testing position;
   actuating a controller applying one of a pressure and a vacuum to said reservoir;
   monitoring a rate of decay of said pressure and said vacuum; and displaying said rate of decay.

10. The method of testing the recuperator core of claim 9 wherein said step of monitoring a rate of decay defines an operational core and a failed core.

11. The method of testing the recuperator core of claim 9 wherein after said step of displaying said rate of decay, said sealing member in sealing relationship with one of said donor inlet end and said recipient inlet end and an other of said sealing member in sealing relationship with one of said donor outlet end and said recipient outlet end are disengaged from said closed or testing position into an open or non testing position and said tested core being positioned in one of an operational core position and a failed core position.

12. The method of testing the recuperator core of claim 9 including positioning a plurality of sensors being operatively connected to said pair of sealing mechanisms and said controller, and said plurality of sensors sensing the proper position of said pair of sealing mechanisms relative to an open or non testing position and said closed or testing position and communicate a signal to said controller before applying one of the pressure and the vacuum to said reservoir.

13. The method of testing the recuperator core of claim 12 including said plurality of sensors include a plurality of safety devices operatively attached to said controller.

14. The method of testing the recuperator core of claim 9 wherein said step of displaying said decay rate includes a readout station.

15. The method of testing the recuperator core of claim 14 wherein said readout station printing a decay rate on said recuperator core.

16. The method of testing the recuperator core of claim 14 wherein said readout station indicating said decay rate defines as a loss of one of a pressure and vacuum per a unit of time.

* * * * *